Feb. 20, 1934. L. A. HACKER 1,948,377
ELECTRIC AUTOMATIC VOLT AND HEAT CONTROL FOR WELDERS
Filed Nov. 17, 1931 2 Sheets-Sheet 1
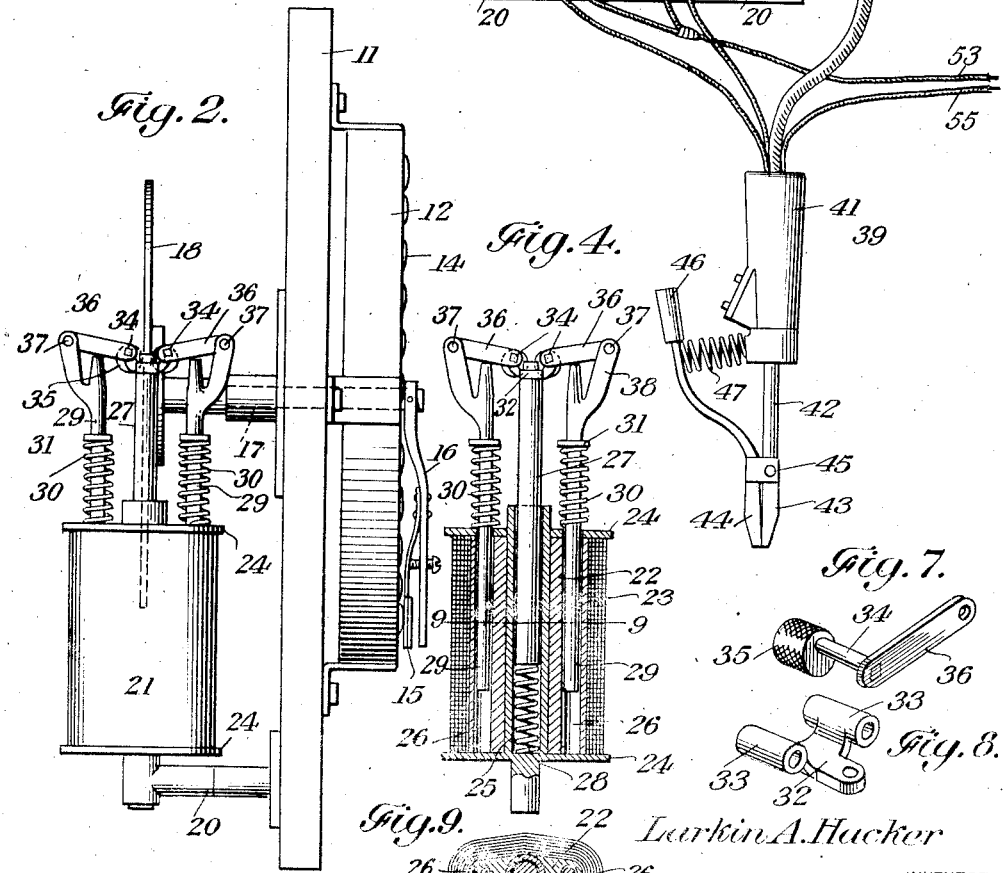

Feb. 20, 1934.    L. A. HACKER    1,948,377
ELECTRIC AUTOMATIC VOLT AND HEAT CONTROL FOR WELDERS
Filed Nov. 17, 1931    2 Sheets-Sheet 2
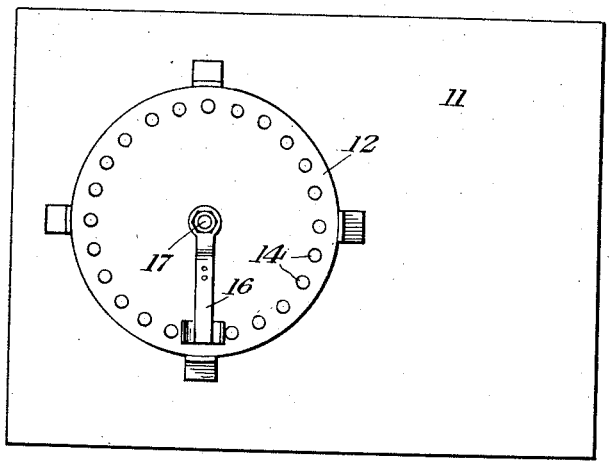
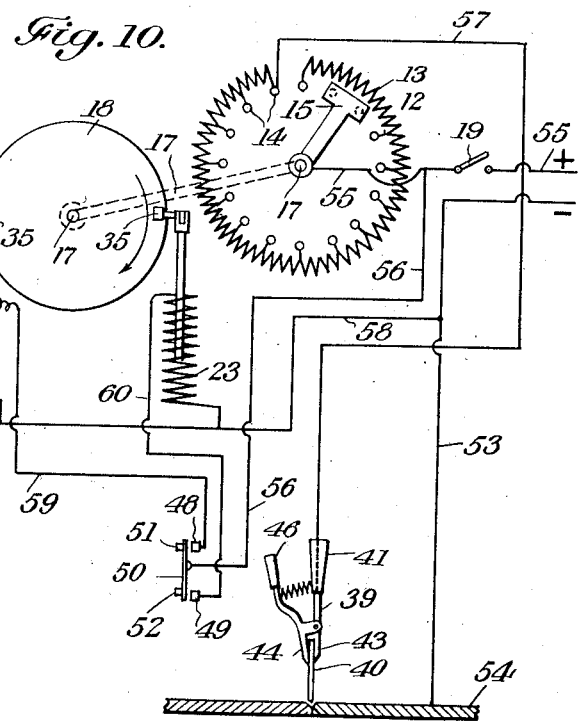
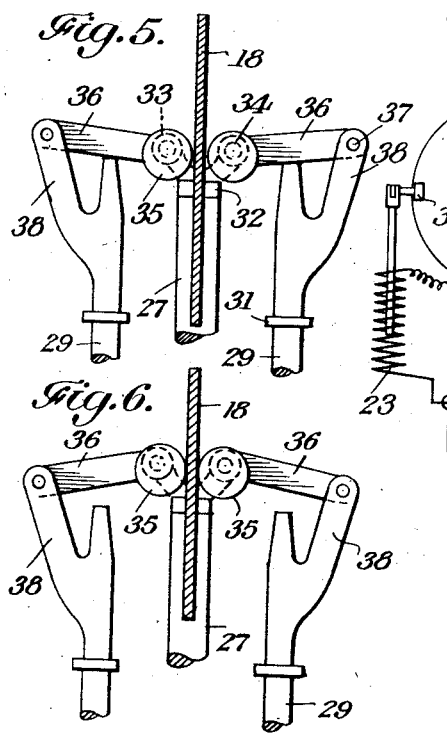
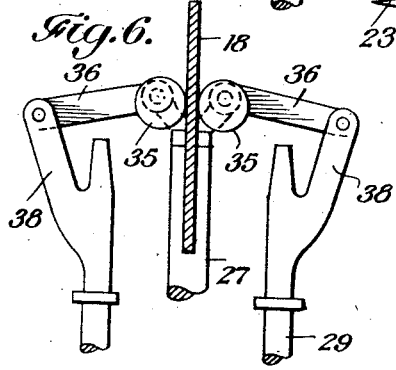
Larkin A. Hacker
INVENTOR
BY Victor J. Evans
and Co.    ATTORNEYS

UNITED STATES PATENT OFFICE 1,948,377

ELECTRIC AUTOMATIC VOLT AND HEAT CONTROL FOR WELDERS

Larkin A. Hacker, Vernon, Tex.

Application November 17, 1931
Serial No. 575,661

5 Claims. (Cl. 175—341)

The invention relates to control means for electric welding apparatus and has for its general object the provision of means carried by a welding electrode holder and readily operable by the user for varying the resistance in the operating circuit and thereby regulate the current so that the heat may be made greater or less as occasion may require.

An important object is to provide an apparatus of this character embodying a rheostat mounted upon a control panel and electrically operated by a control switch located at any remote point desired and carried directly upon the electrode holder.

A more specific object of the invention is to provide an apparatus of this character in which there is provided a rotatable rheostat interposed in the circuits to a welding electrode, means being provided for rotating the rheostat intermittently or step by step by magnetic means mounted on the control panel and responsive to the action of switch means mounted on the electrode holder and connected in circuit with the magnetic means.

A more specific object is to provide an apparatus of this character in which the shaft of the rotatable rheostat is provided with a disk adapted to be gripped by electromagnetically operated means so that an intermittent or step by step rotation may be given to the disk and consequently to the rheostat for varying the resistance in the welding circuit, the rheostat and disk rotating means being stationarily mounted upon a panel or the like and the electromagnetic gripping means being controlled by the user of the welding electrode by the simple expedient of operating a switch on the handle of the electrode holder.

An additional object is to provide an apparatus of this character which will be simple and inexpensive to manufacture, easy to control, positive in action, efficient and durable in service, and a general improvement in the art.

With the above and other objects and advantages in view, the invention preferably consists in the details of construction and the arrangement and combination of parts to be hereinafter more fully described and claimed, and illustrated in the accompanying drawings, in which Figure 1 is a front elevation of the control panel and electrode holder constructed in accordance with my invention.

Figure 2 is a side elevation of the panel equipped with the rheostat and electromagnetic means for moving the same.

Figure 3 is a rear elevation of the panel showing the rheostat thereon.

Figure 4 is a longitudinal section taken through one of the electromagnetic disk gripping devices.

Figure 5 is a fragmentary view showing the gripping devices in released position.

Figure 6 is a similar view showing the same in active position.

Figure 7 is a detail perspective view of one of the gripping eccentrics.

Figure 8 is a detail perspective view of the mounting for the two eccentrics.

Figure 9 is a cross section taken on the line 9—9 of Figure 4 and

Figure 10 is a diagram showing the electric circuit involved.

Referring more particularly to the drawings, the numeral 11 designates the control panel which may be stationarily mounted or which may form part of a portable equipment. Mounted upon the rear side of this panel in any desired manner is a conventional type of rotary rheostat 12 carrying a resistance coil 13 tapped at various points and brought out to a series of contacts 14 adapted to be traveled over by a spring contact 15 carried by and adjustable with respect to an arm 16 carried by a shaft 17 journaled through a suitable bearing on the front of the panel and carrying an operating disk 18. Clearly, by rotating the disk the spring contact 15 may be caused to move into engagement with the successive contacts 14 of the rheostat for throwing more or less resistance into whatever circuit is connected with the rheostat. Of course such a panel is equipped with a knife or other control or cut off switch 19 which is, however, of very minor importance insofar as it forms no part of the present invention.

Mounted on the panel 11 by means of brackets 20 are similar electro-magnets 21 located at opposite sides of a vertical plane passing through the shaft 17. Each magnet includes an iron body or core 22 wrapped with wire 23 retained in place by end flanges 24 on the body. The body or core of each magnet is formed with a central recess 25 and a pair of bores 26 located at opposite sides thereof, this recess and bores converting the magnet into a solenoid. Slidable within the recess 25 of each magnet or solenoid is a plunger 27 urged upwardly by a coil spring 28 located in the bottom of the recess, and slidable within the bores 26 are stems 29 urged upwardly by encircling coil springs 30 abutting against the upper flange 24 and against abutment flanges 31 on the stems. Secured upon the upper end of each plunger 27 is a yoke 32 formed with spaced bearings 33 within which are rotatably engaged stud shafts 34 equipped at one end with eccentrics 35 and provided at their other ends with arms 36 pivoted at 37 upon laterally off-set ears 38 on the upper portions of the stems 29. The upper ends of the stems 29 are at a lower level than the pivots 37 and are immediately beneath the arms 36 so as to be engaged thereby at certain times in a manner and for a reason to be described. While the shafts 34 are rotatable through the bearings 33, it should be distinctly understood that the arms 36 and the eccentrics 35 are rigid upon the shaft 34 so as to be incapable of rotation with respect thereto. The arrangement is such that when the arms 36 converge downwardly the eccentrics 35 will be spaced away from the disk 18 while when the arms 36 converge upwardly the eccentrics 35 will be in close engagement with the disk.

The numeral 39 designates, as a whole, the holder for the electrode 40 which is used for welding, and such a holder comprises a handle 41 from which projects a shank 42 terminating in a jaw 43 with which cooperates a second jaw 44 pivoted at 45 and having a handle portion 46 offset with respect to the handle 41 and normally urged away from the same by a spring 47, the arrangement being such that when the operator grasps the handles 41 and 46 and presses them together the jaws 43 and 44 will be moved apart to release the electrode 40 and to permit the insertion of a new one when such is necessary. However, ordinarily the holder 39 is used simply by holding it by the handle 41. In accordance with my invention the handle 41 is provided interiorly with a switch of the double push button type but of any conventional construction and including contacts 48 and 49 adapted to be engaged by a pivoted bar 50 equipped with push buttons 51 and 52 projecting beyond the handle 41 in convenient position so that either one or the other may be pressed for instance by the thumb of the operator so as to rock the bar 50 and bring it into engagement either with the contact 48 or the contact 49, depending upon circumstances to be explained.

The electrical connections of the apparatus are as follows: A conductor 53 leading from whatever source of current is convenient connects with the metal plate or plates 54 to be welded, cut or otherwise treated by current. The numeral 55 designates a conductor which leads from the other pole of the source of current and which connects through the switch 19 to the shaft 17 and consequently the arm 16 and contact 15 of the rheostat. Branching from the conductor 55 is a conductor 56 which connects with the rocking contact bar 50 of the control switch within the handle 41 of the electrode holder. One terminal of the resistance coil 13 is connected by a conductor 57 leading through the handle 41, with the shank 42 and consequently the jaw 43 of the holder 39 so as to feed current to the electrode 40. Connected with the conductor 53 is a branch conductor 58 which is connected with one terminal of each of the magnet coils or solenoid coils 23. The other terminal of the left solenoid coil 23 is connected by a conductor 59 with the contact 48, while the remaining terminal of the right hand solenoid coil 23 is connected by a conductor 60 with the contact 49.

Assuming that the mechanism has been constructed and assembled and the electrical connections made as shown and described, the apparatus is ready for use simply by closing the switch 19, whereupon current will flow from the source through the conductor 53 to the material 54 to be welded or otherwise worked upon, through the electrode 40, jaw 43, shank 42, conductor 57, whatever part of the rheostat coil 13 is in the circuit, contact arm 15, shaft 17, and conductor 55 back to the source. This is of course the main circuit and accomplishes the welding. Assuming that it is desired to have a more intense current so that a greater degree of heat will be generated at the point of engagement of the electrode 40 with the material 54, it is merely necessary for the operator to place his thumb or any convenient finger upon the contact button 52 and press it so as to bring the rocking bar 50 into engagement with the contact 49. When this is done, current flowing from the source through the conductor 53 to the material 54 will branch and a part will flow through the conductor 58, through the coil 23 of the right hand solenoid or magnet, through the conductor 60 contact 49, contact bar 50, conductor 56, and conductor 55 back to the source. This will of course cause energization of the right hand electro-magnet or solenoid 21 and the plunger 27 and stems 29 will be drawn into the body or core to the lower ends of the recess 25 and bores 26, respectively. The movement is comparatively slow as it is checked by the spring 28 in the bottom of the recess 25 and also by the springs 30 which abut against the flanges 31 on the stems 29. The spring 28 is of greater strength but of less activity than the springs 30, so that the resistance that it interposes to the movement of the plunger 27 causes the latter to lag behind the stems 29 in the downward movement of the three. Thus the arms 36 will be swung from the downwardly converging position shown in Figure 5 to the upwardly converging position shown in Figure 6, thereby bringing the eccentrics 35 into engagement with the disk 18 and effecting a gripping action of them on the disks. The continued downward movement then of the plunger and stems will result in an angular or turning movement to the contact arm of the rheostat, shifting its contact spring into engagement with the next fixed contact 14 and reducing the amount of resistance included in the main circuit by one step. As soon as the operator releases his pressure upon the button 52 the current or circuit through the right hand solenoid coil 23 will be broken whereupon the springs 28 and 30 will operate to return the plunger 27 and stems 29 to their upper position as shown in Figure 5, the plunger lagging in movement behind the stems due to the relative sluggishness of its spring 28 and the arms 36 then assuming a downwardly converging position so that the eccentrics 35 will be disengaged from the disk 18. If a still heavier current is desired, the operation is repeated and the disk 18 and consequently the contact arm 15 may therefore be moved step by step until all the resistance is cut out of the circuit if desired. Of course the operation may be stopped at any time that the current is found to be of the proper strength.

In case less current is desired at any time the disk 18 must be moved in the other direction and this is accomplished by the operator pressing upon the button 51 to bring the bar 50 into engagement with the contact 48 whereupon current from the source flowing through the conductor 53 will branch through the conductor 58, left hand solenoid coil 23, conductor 59, contact 48, bar 50, conductor 56, switch 19 and conductor 55 back to the source. The energization of the left hand solenoid coil 23 will result in operation of its gripping mechanism in exactly the same way as described in connection with the right hand solenoid coil 23, the only difference being that when the left hand solenoid coil 23 is energized its gripping mechanism will rotate the disk 18 in a direction opposite to that above described so that the contact arm 15 will be caused to move in the opposite direction along the series of contacts 14 and interpose more resistance into the circuit. By a proper manipulation of the buttons 51 and 52 the operator, no matter how far he may be from the control panel 11 and its apparatus may easily and accurately determine the intensity of the current fed to the electrode so that the proper degree of heat may be obtained.

From the foregoing description and a study of the drawings it will be apparent that I have thus provided a simply constructed and very easily operated apparatus which will be highly efficient for the purpose and which is not likely to get out of order. It is thought from the foregoing that the construction, operation and advantages should be readily apparent to one skilled in the art without further explanation.

While I have shown and described the preferred embodiment of the invention, it should be understood that I reserve the right to make all such changes in the details of construction as well as in the arrangement and combination of the parts as will not depart from the spirit of the invention or the scope of the subjoined claims.

Having thus described the invention I claim.

1. In an electrical apparatus, a rotary member, and electro-magnetic means controllable from a remote point for rotating said member in a selected direction step by step, said electro-magnetic means comprising solenoids, elements attractable thereinto, arms pivoted on said elements and disks eccentrically pivoted on said arms adapted to grip the member and partially rotate the same.

2. In an electrical apparatus, a rotary member, and electro-magnetic means controllable from a remote point for rotating said member in a selected direction step by step, said electro-magnetic means comprising solenoids located at diametrically opposite sides of the axis of said member, elements attractable into the solenoids, and eccentric members located in front of opposite faces of the member and actuated by movement of said elements to engage and partially rotate the member.

3. In an electrical apparatus, a rotary member, and means controllable from a remote point for rotating said rotary member step by step in a selected direction, said means comprising a solenoid, a pair of outwardly spring pressed cores slidable therein and attractable thereinto, an outwardly spring pressed rod slidable within the solenoid between said cores, arms pivoted at their outer ends upon the projecting outer ends of said cores and connected at their inner ends with the projecting outer end of said rod, and disks eccentrically mounted on the adjacent ends of said arms and movable upon swinging of said arms in one direction to engage against opposite sides of said rotary member and to impart rotary movement thereto.

4. In an electrical apparatus, a rotary member, a disk operatively connected with said rotary member, a solenoid, a pair of outwardly spring pressed cores attractable into the solenoid, arms pivoted on the projecting outer ends of said cores, an outwardly spring pressed rod slidable within the solenoid and located between said cores, a bearing member carried by the projecting outer end of said rod, shafts carried by the inner ends of said arms and journaled through said bearing member, and eccentric members fixed upon said shafts and located at opposite sides of said disk and engageable therewith to effect rotation thereof upon swinging movement of the arms resulting from movement of the cores into the solenoid.

5. In an electrical apparatus, a rotary member, and means controllable from a remote point for rotating said member step by step in a selected direction, said means comprising a solenoid, a pair of outwardly spring pressed cores slidable therein and attractable thereinto, an outwardly spring pressed rod slidable within the solenoid between said cores, arms pivoted at their outer ends upon the projecting outer ends of said cores and connected at their inner ends with the projecting outer end of said rod, disks eccentrically mounted on the adjacent ends of said arms and movable upon swinging of said arms in one direction to engage against opposite sides of said member and to impart rotary movement thereto, said cores and rod being relatively movable and being movable to different extents, and stop means on the outer ends of the cores engageable with the arms for limiting swinging movement thereof in one direction.

LARKIN A. HACKER.